June 11, 1935. A. A. AHRONHEIM 2,004,360
METHOD AND APPARATUS FOR TELEGRAPHICALLY TRANSMITTING
COLORED MOVING PICTURES OR SCENES
Original Filed Aug. 7, 1930 2 Sheets-Sheet 1
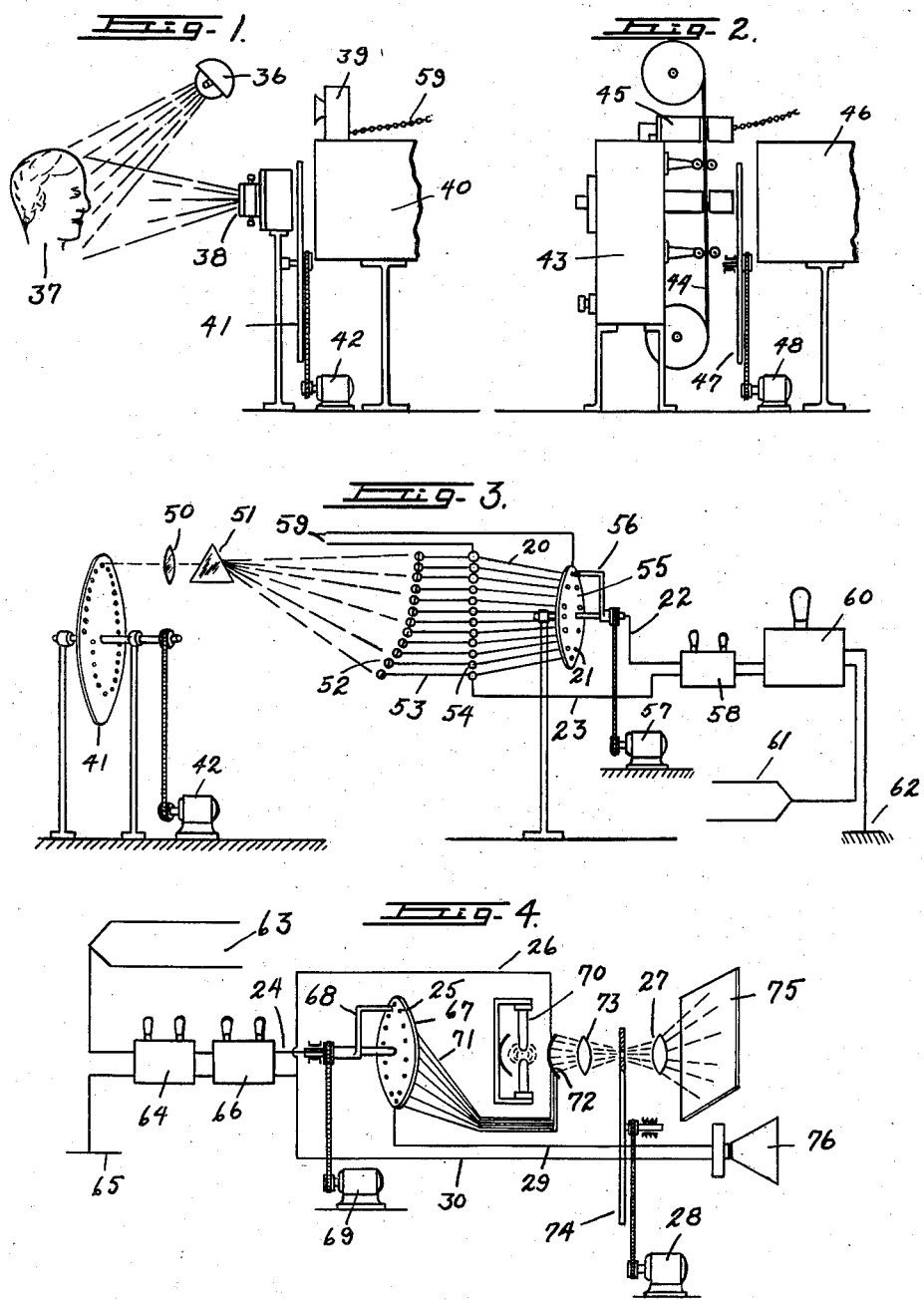

June 11, 1935.  A. A. AHRONHEIM  2,004,360
METHOD AND APPARATUS FOR TELEGRAPHICALLY TRANSMITTING
COLORED MOVING PICTURES OR SCENES
Original Filed Aug. 7, 1930   2 Sheets-Sheet 2

WITNESS
H. L. Meade

INVENTOR
A. A. Ahronheim
BY
Denison & Thompson
ATTORNEYS

Patented June 11, 1935

2,004,360

UNITED STATES PATENT OFFICE 2,004,360

METHOD AND APPARATUS FOR TELEGRAPHICALLY TRANSMITTING COLORED MOVING PICTURES OR SCENES

Albert Alexander Ahronheim, Jackson, Mich., assignor of one-half to William Sparks, Jackson, Mich.

Original application August 7, 1930, Serial No. 473,661. Divided and this application February 17, 1932, Serial No. 593,519

3 Claims. (Cl. 178—6)

This invention relates to the method and apparatus for telegraphically transmitting colored moving pictures or scenes with sound accompanying the same, and is a division of my copending application, Serial No. 473,661, filed August 7th, 1930.

The main object of this invention is to provide a method and apparatus for the simultaneous electrical transmission of sound and scene either by wire or wireless.

A further object of this invention is to provide a method and apparatus for the transmission of scene accompanied by sound, in which the scene is transmitted in its natural color.

Other objects and advantages relate to the details of the apparatus and to the arrangement and relation of the various parts thereof, all as will more fully appear from the following description, taken in connection with the accompanying drawings in which:

Figure 1 is a schematic illustration of the transmitting apparatus of my invention.

Figure 2 is a schematic illustration of a modified form of transmitting equipment adapted for the transmission of sound moving pictures.

Figure 3 is a diagrammatic view of the transmitting apparatus.

Figure 4 is a diagrammatic view of the receiving apparatus.

Figure 5:
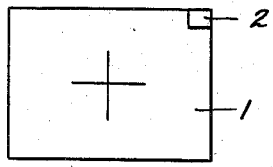
Figure 6:
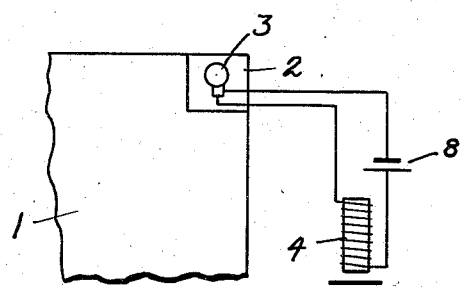
Figure 7:
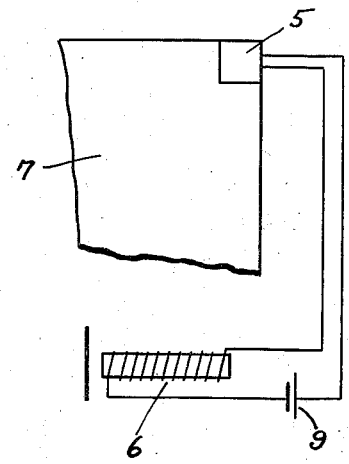

Figures 5, 6 and 7 relate to apparatus used in connection with the above for the simultaneous transmission of sound and scene.

In Figure 1, a source of light 36 is provided to illuminate a moving picture or scene 37 which is to be transmitted with accompanying sound. A lens system 38 collects the light rays from the scene and directs the same onto a revolving Nipkow disk 41 driven by motor 42 or onto any other suitable scanning device.

From scanning disk 41, the light rays pass to the transmitter proper, diagrammatically illustrated in Figure 3 and which may be housed in casing 40. A lens system 50 collects the light rays from scanning disk 41 and directs the same onto a prism 51 which decomposes them into their respective spectrums.

A group of radially arranged photo-electric cells 52 are so positioned to receive the various spectral bands produced by prism 51. Photo-electric cells 52 are connected by wires 53 to an equal number of relays 54 which, in turn, are connected by wires 20 to contacts 21 of a contact disk 55.

A contact arm 56 driven by motor 57 successively connects contacts 21 through wire 22 to an amplifier 58. Relays 54 may have a common return circuit from amplifier 58 through wire 23. The output of amplifier 58 is applied to a high frequency carrier wave produced in transmitter 60 which transmits the modulated carrier wave through antenna 61 and ground 62. The output of amplifier 58 may also be fed directly into a wire line and transmitted to the receiving station to be hereinafter more fully described.

Photo-electric cells 52 are made responsive to the bands in a white spectrum and correspondingly arranged in that order. They are also constructed so that when actuated by their respective spectral colors, they will fluctuate between a minimum and maximum value of their electrical conductivity to produce impulses of current, the maximum value of which will always be within small limits of the same value. These current impulses may then be transmitted to relays 54 which are normally open, but close upon receiving the impulses, whereupon the same are transmitted to contact disk 55.

Contact arm 56 successively makes contact between relays 54 and amplifier 58 to conduct the respective current impulses representing the picture or scene to be transmitted. Sound accompanying the scene is picked up by microphone 39 and converted into electrical pulsations which are conducted by wire 59 through contact disk 55 to amplifier 58.

In Figure 2 an apparatus is shown for the transmission of sound and scene recorded upon a sound moving picture film. Film 44 having sound and picture records thereon is fed through a kinematic projection apparatus 43. The picture portion may be projected upon a Nipkow disk 47 driven by motor 48 or any other suitable scanning system. The resultant scanning rays then proceed to the transmitting apparatus, as shown in Figure 3, in a manner previously described.

A well-known sound reproducing device 45 consisting of a sound lamp and photo-electric cell may be used to convert the sound record on the film into electrical variations which are conducted to amplifier 58 through contact disk 55 by wires 59 in a similar manner, as previously described.

The receiving apparatus comprises, as shown in Figure 4, a receiving antenna 63 connected to a receiving set 64 grounded at 65. The output of receiving set 64 may be strengthened by an amplifier 66 connected by wire 24 to contact arm 68 of contact disk 67. Contacts 25 are connected by wires 71 to Kerr cells 72 covered with colored glass plates corresponding to the color bands of a white spectrum.

Kerr cells 72 may have a common return circuit through wire 26 connected with amplifier 66. An arc light or other suitable source of illumination 70, is directed onto Kerr cells 72 which, upon receiving the electrical impulses through the contact disk 67 from amplifier 66, will allow light to pass through the colored plates which may be collected by lens 73 and directed to a suitable scanning device as Nipkow disk 74.

The scanned scene may then be directed through lens 27 onto a viewing screen 75. Contact arm 68 is driven by motor 69 in synchronism with contact arm 56 of the sending apparatus. Disk 74 is also driven as by electric-motor 28 in synchronism with disk 41 of the sending apparatus.

The electrical impulses corresponding to the accompanying sound are converted by loud speaker 76 which is connected by wire 29 to contact disk 67 and by wire 30 to amplifier 66 into the original sound. Thus it is seen that electrical impulses corresponding to definite color bands produced by photo cells 62 with the accompanying sound may be successively transmitted by either wire or wireless.

The receiving apparatus receives these electrical impulses which, by means of the contact arrangement, successively energize Kerr cells 72 to allow light rays from light source 70 to pass through corresponding color plates. The colored light thus produced in proper sequence is then scanned to reproduce the scene being transmitted in its original colors.

The accompanying sound transmitted in the form of electrical impulses will be faithfully reproduced through the synchronous contact system. A modified method of transmitting the accompanying sound may be used, as shown in connection with Figures 5, 6 and 7. The scene to be transmitted may be directed onto a screen 1 having at one corner thereof a translucent portion 2, in this instance, shown in the form of a square. In back of portion 2 and enclosed in a suitable casing may be placed a source of light 3 adapted to be modulated by a microphone 4 in circuit therewith and including a battery 8.

Microphone 4 converts the accompanying sound into electrical variations which, in turn, modulate light 3 to produce corresponding light fluctuations which are visible from the front side of the screen 1 and may be transmitted simultaneously with the scene in the manner previous described.

At the receiving station, the viewing screen 7 is also provided with a square portion 5 of either a transparent or translucent nature in back of which may be located a photo-electric cell connected in circuit with battery 9 and a sound reproducer or loud speaker 6.

A fluctuating light spot produced by light 3 will be transmitted simultaneously with the scene and received as such on portion 5 of screen 7, whereupon the photo-electric device in back of portion 5 converts the fluctuating light spot into the likeness of the original sound.

Although I have shown and described specific apparatus for the transmission of colored moving pictures or scenes with accompanying sound, it is to be understood that the same was merely for the purpose of illustration, and that many changes may be made in the apparatus and the arrangement thereof without departing from the spirit and scope of the appended claims.

I claim:

1. An apparatus for simultaneously transmitting colored moving pictures or scenes and sound accompanying the same comprising means for scanning the picture or scene to be transmitted, means for decomposing the scanning rays thus produced into their spectrum, a group of photo-electric cells adapted to receive the bands of said spectrum to produce current impulses, an equal number of current relays in circuit with said photo-electric cells, a contact disk having a contact connected with each of said relays, a synchronously revoluble contact arm, a microphone in circuit with said contact disk for converting the accompanying sound into current impulses, and means including said contact disk and said arm for successively transmitting said picture and said sound current impulses.

2. An apparatus for simultaneously transmitting colored moving pictures or scenes and sound accompanying the same comprising means for scanning the picture or scene to be transmitted, means for decomposing the scanning rays thus produced into their spectrum, a group of photo-electric cells adapted to receive the bands of said spectrum to produce current impulses, said cells being so constructed to fluctuate between their minimum and maximum value of their electrical conductivity to produce said impulses of current, the maximum value of which will always be within small limits of the same value, an equal number of current relays in circuit with said photo-electric cells, a contact disk having a contact connected with each of said relays, a synchronously revoluble contact arm, a microphone in circuit with said contact disk for converting the accompanying sound into current impulses, and means including said contact disk and said arm for successively transmitting said picture and said sound current impulses.

3. An apparatus for the simultaneous reception of sound and scene transmitted in accordance with apparatus of claim 5 comprising means for receiving current impulses corresponding to said sound and scene, a group of electro-sensitive colored light relays, a source of light adapted to direct rays of light through said relays, means including a synchronously rotatable contact arm and contact disk for conducting said current impulses corresponding to the picture being transmitted to said relays to cause the same to pass the respective colors being transmitted, means including a scanning device for directing said respective colors onto a screen in proper sequence to reproduce the original picture, and a translating means in circuit with said contact arm and said contact disk for converting said sound current impulses into the likeness of the sound being transmitted.

ALBERT ALEXANDER AHRONHEIM.